United States Patent
Agyapong et al.

(10) Patent No.: US 10,182,393 B2
(45) Date of Patent: Jan. 15, 2019

(54) MACRO-CELL ASSISTED SMALL CELL DISCOVERY AND RESOURCE ACTIVATION

(71) Applicant: NTT DoCoMo, Inc., Chiyoda-ku, Tokyo (JP)

(72) Inventors: Patrick Agyapong, München (DE); Emmanuel Ternon, München (DE); Liang Hu, München (DE); Katsutoshi Kusume, München (DE); Mikio Iwamura, München (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/167,230

(22) Filed: May 27, 2016

(65) Prior Publication Data

US 2016/0278004 A1    Sep. 22, 2016

Related U.S. Application Data

(63) Continuation of application No. PCT/EP2014/075186, filed on Nov. 20, 2014.

(30) Foreign Application Priority Data

Nov. 28, 2013    (EP) .................................. 13194853

(51) Int. Cl.
*H04W 24/10* (2009.01)
*H04W 36/00* (2009.01)
(Continued)

(52) U.S. Cl.
CPC ........... *H04W 48/16* (2013.01); *H04W 16/32* (2013.01); *H04W 24/10* (2013.01); *H04W 76/10* (2018.02); *H04W 76/27* (2018.02); *H04W 84/045* (2013.01)

(58) Field of Classification Search
CPC ............ H04W 36/22; H04W 52/0206; H04W 52/0225; H04W 52/02; H04W 72/0453
(Continued)

(56) References Cited

U.S. PATENT DOCUMENTS

2006/0013179 A1    1/2006 Yamane
2006/0050742 A1    3/2006 Grandhi et al.
(Continued)

FOREIGN PATENT DOCUMENTS

CN    102348244 A    2/2012
CN    104519557 A    4/2015
(Continued)

OTHER PUBLICATIONS

"Dormant Small Cell Discovery", Agenda Item: 6.2.5.2.2 *ETRI 3GPP TSG RAN WGI#73*, Fukuoka, Japan, May 20, 2013-May 24, 2013, 4 pages.
(Continued)

*Primary Examiner* — Julio R Perez
(74) *Attorney, Agent, or Firm* — Osha Liang LLP

(57) ABSTRACT

A method is described for controlling a small cell base station in a wireless communication system having a plurality of small cell base stations controlled by a macro base station. The method includes taking, by a small cell base station, a measurement for obtaining information describing a vicinity around the small cell base station and reporting the information from the small cell base station to the macro base station.

14 Claims, 6 Drawing Sheets

(51) Int. Cl.
*H04W 48/00* (2009.01)
*H04W 12/06* (2009.01)
*H04W 60/02* (2009.01)
*H04W 48/16* (2009.01)
*H04W 16/32* (2009.01)
*H04W 76/27* (2018.01)
*H04W 76/10* (2018.01)
*H04W 84/04* (2009.01)

(58) Field of Classification Search
USPC .................................. 455/423, 438, 443, 444
See application file for complete search history.

(56) References Cited

U.S. PATENT DOCUMENTS

| | | | |
|---|---|---|---|
| 2007/0230400 | A1 | 10/2007 | Kuchibhotla et al. |
| 2008/0034081 | A1 | 2/2008 | Marshall et al. |
| 2009/0180478 | A1 | 7/2009 | Yu et al. |
| 2010/0304748 | A1 | 12/2010 | Henttonen et al. |
| 2011/0176634 | A1 | 7/2011 | Yoon et al. |
| 2011/0183675 | A1 | 7/2011 | Bae et al. |
| 2013/0088983 | A1 | 4/2013 | Pragada et al. |
| 2013/0157643 | A1* | 6/2013 | Yoo ............... H04W 24/02 455/418 |
| 2013/0165130 | A1 | 6/2013 | Wu et al. |
| 2014/0079026 | A1* | 3/2014 | Dimou ............ H04W 36/04 370/332 |
| 2015/0003348 | A1* | 1/2015 | Ishii ............... H04L 27/2601 370/329 |
| 2015/0018002 | A1* | 1/2015 | Touag ............. H04W 16/14 455/454 |
| 2015/0045038 | A1* | 2/2015 | Gao ............... H04W 36/22 455/438 |
| 2015/0119047 | A1* | 4/2015 | Macias ........... H04W 52/0206 455/444 |
| 2015/0215852 | A1* | 7/2015 | Gou ............... H04W 48/16 455/434 |
| 2015/0319620 | A1* | 11/2015 | Kato ............... H04L 5/0048 370/328 |
| 2015/0350969 | A1 | 12/2015 | Dudda et al. |
| 2016/0242112 | A1 | 8/2016 | Gao et al. |

FOREIGN PATENT DOCUMENTS

| | | |
|---|---|---|
| EP | 2 112 846 A1 | 10/2009 |
| EP | 2 224 766 A1 | 9/2010 |
| EP | 2 299 759 A1 | 3/2011 |
| EP | 2 355 594 A1 | 8/2011 |
| EP | 2 677 803 A1 | 12/2013 |
| EP | 2 836 022 A1 | 2/2015 |
| GB | 2 479 376 A | 10/2011 |
| GB | 2479376 A * | 12/2011 |
| JP | 2006-054849 A | 2/2006 |
| JP | 2010-507963 A | 3/2010 |
| JP | 2010-246097 A | 10/2010 |
| JP | 2011-511531 A | 4/2011 |
| JP | 2012-505578 A | 3/2012 |
| JP | 2012-195828 A | 10/2012 |
| JP | 2013-523018 A | 6/2013 |
| JP | 2013-531404 A | 8/2013 |
| JP | 2013-219499 A | 10/2013 |
| JP | 2013-539328 A | 10/2013 |
| WO | WO 2008/051124 A1 | 5/2008 |
| WO | WO 2009/096839 A1 | 8/2009 |
| WO | WO 2010/049120 A1 | 5/2010 |
| WO | WO 2011/083866 A1 | 7/2011 |
| WO | WO 2011/116017 A1 | 9/2011 |
| WO | WO 2011/132847 A1 | 10/2011 |
| WO | WO 2011/137152 A2 | 11/2011 |
| WO | WO 2012/046985 A2 | 4/2012 |
| WO | WO 2012/075049 A1 | 6/2012 |
| WO | WO 2012/128999 A2 | 9/2012 |
| WO | 2012154100 A1 | 11/2012 |
| WO | WO 2012/146167 A1 | 11/2012 |
| WO | WO 2013/011191 A1 | 1/2013 |
| WO | WO 2013167807 A1 * | 5/2013 |
| WO | WO 2013/086164 A1 | 6/2013 |
| WO | WO 2013/167807 A1 | 11/2013 |

OTHER PUBLICATIONS

Prasad et al., "Enhanced Small Cell Discovery in Heterogeneous Networks Using Optimized RF Fingerprints", *IEEE 24th International Symposium on Personal, Indoor and Mobile Radio Communications: Mobile and Wireless Networks*, Sep. 2013, 6 pages.

Search Report and Written Opinion in corresponding International Application No. PCT/EP2014/075186, dated Dec. 12, 2014, 9 pages.

"Small Cell Discovery Performance Based on UL Signals", *3GPP TSG RAN WG1 Meeting #75*, Agenda Item 6.2.6.2, R1-135166, San Francisco, USA, Nov. 11-15, 2013, 8 pages.

Office Action in U.S. Appl. No. 15/167,358, dated Jun. 6, 2017, 21 pages.

Author Unknown, "Summary of Email Discussion [82#15][LTE/Het-Net] Small Cell Discovery", *3GPP TSG-RAN WG2 #83*, Doc. No. R2-132995, Barcelona, Spain, Aug. 19-23, 2013, 19 pages.

Author Unknown, "Small Cell Discovery Signal-Efficient Operation of Small Cells", *3GPP TSG-RAN WG1 Meeting #74bis*, Doc. No. R1-134325, Guangzhou, China, Oct. 7-11, 2013, 8 pages.

Office Action in corresponding U.S. Appl. No. 15/167,358, dated Dec. 15, 2016, 20 pages.

Office Action in corresponding U.S. Appl. No. 15/167,264, dated Apr. 18, 2017, 14 pages.

Office Action in corresponding U.S. Appl. No. 15/167,398, dated Apr. 25, 2017, 12 pages.

"E-UTRA Mobility Enhancements in Heterogeneous Networks", *3GPP*, Technical Report TR 36.839, V11.1.0, Dec. 2012, 53 pages.

"Performance Evaluation of ICIC for SCE", Agenda Item: 7.2.6.1.3 *NTT DOCOMO 3GPP TSG RAN WG1 Meeting I#74*, Barcelona, Spain, Aug. 19-Aug. 23, 2013, 6 pages.

"Self-Optimizing Networks: The Benefits of SON in LTE", *4G Americas*, Jul. 25, 2011, 70 pages.

"Small Cell On-Off for Operation Efficiency Improvement", *3GPP TSG RAN WG1 Meeting #72bis*, Chicago, USA, Apr. 15-19, 2013, 5 pages.

Honkavirta et al., "A Comparative Survey of WLAN Location Fingerprinting Methods", *Proc. of the 6th Workshop on Positioning, Navigation and Communication*, 2009, (WPNC'09), pp. 243-251.

Hossain, A.K.M. et al., "SSD: A Robust RF Location Fingerprint Addressing Mobile Devices' Heterogeneity", *IEEE Transactions on Mobile Computing*, Nov. 2011, pp. 65-77.

Kabir et al., Radiolocation Architecture in CDMA Cellular Systems Based on Fingerprinting Combining Neural Networks, *IEICE Society Conference*, Sep. 2009, 2 pages.

Kaemarungsi, K. et al., "Modeling of Indoor Positioning Systems Based on Location Fingerprinting", *IEEE Infocom*, 2004, 11 pages.

Kjaergaard, M., "A Taxonomy for Radio Location Fingerprinting" *Lecture Notes in Computer Science*, Springer, 2007, pp. 139-156.

Prasad, A. et al., "Energy-Efficient Inter-Frequency Small Cell Discovery Techniques for LTE-Advanced Heterogeneous Network Deployments", *IEEE Communications Magazine*, May 2013, pp. 72-81.

Ternon, E. et al., "Database-Aided Energy Savings in Next Generation Dual Connectivity Heterogeneous Networks", *IEEE*, 2014, 6 pages.

"Discovery Signal on Macro Cell Operation Frequency for Small Cell Detection", *ITRI*, 3GPP TSG-RAN WG2 #82 R2-131816, 3GPP, May 2013, pp. 1-3.

"Views on Small Cell On/Off with Small Cell Discovery", *NTT DOCOMO*, 3GPP TSG RAN WG1 Meeting #74bis R1-134496, 3GPP, Oct. 2013, 5 pages.

"Views on Enhanced Small Cell Discovery", *NTT DOCOMO*, 3GPP TSG RAN WG1 Meeting #72bis, 3GPP, Apr. 19, 2013, 9 pages.

(56) References Cited

OTHER PUBLICATIONS

Office Action, and English language translation thereof, in corresponding Japanese Application No. 2016-555913, dated Jun. 23, 2017, 7 pages.
Office Action, and English language translation thereof, in corresponding Japanese Application No. 2016-555914, dated Jun. 30, 2017, 6 pages.
Office Action, and English language translation thereof, in corresponding Japanese Application No. 2016-555915, dated Jun. 23, 2017, 10 pages.
Office Action, and English language translation thereof, in corresponding Japanese Application No. 2016-555916, dated Jun. 23, 2017, 7 pages.
Office Action, and English language translation thereof, in corresponding Japanese Application No. 2016-555914, dated Dec. 19, 2017, 5 pages.
Office Action issued in the corresponding U.S. Appl. No. 15/167,264, dated May 16, 2018 (15 pages).
Office Action issued in the corresponding U.S. Appl. No. 15/167,398, dated Mar. 21, 2018 (14 pages).
Office Action issued in the counterpart Chinese Patent Application No. 2014800648421, dated Oct. 9, 2018 (19 pages).
Office Action issued in the counterpart Chinese Patent Application No. 201480064920.8, dated Oct. 8, 2018 (18 pages).
Office Action issued in the counterpart Chinese Patent Application No. 201480064841.7, dated Oct. 8, 2018 (13 pages).

* cited by examiner

MACRO-CELL ASSISTED SMALL CELL DISCOVERY AND RESOURCE ACTIVATION

CROSS-REFERENCE TO RELATED APPLICATIONS

This application is a continuation of copending International Application No. PCT/EP2014/075186, filed Nov. 20, 2014, which is incorporated herein by reference in its entirety, and additionally claims priority from European Application No. EP13194853, filed Nov. 28, 2013, which is also incorporated herein by reference in its entirety.

The present invention relates to the field of wireless communication networks, especially to the field of wireless communication systems including a macro base station controlling a plurality of small cell base station, also referred to as control/user-plane separated networks.

BACKGROUND OF THE INVENTION

In a wireless communication system including, e.g., an heterogeneous network as radio access network, control signals and user data signals may be separated into two distinct overlaid networks, a network of macro cells wherein each macro cell includes a macro base station (e.g. referred to as MeNB), and a network of small cell base stations (also referred to as SeNB) controlled by one macro base station. Such overlaid networks are also called control/user-plane separated networks or C/U-plane separated networks (including a control plane base station controlling a plurality of user plane base stations).

FIG. 1 shows the general structure of a wireless communication system having two distinct overlaid networks. The networks comprise a macro cell network including one or more macro cells, each including a macro base station (MeNB). FIG. 1 schematically shows a single MeNB 100. The macro cells operate in currently existing frequency bands, for example in the 2 Gigahertz frequency band, using currently standardized systems like LTE/LTE-A and also guarantee backwards compatibility for legacy user equipments (UEs or mobile stations), i.e., such UEs which just support the current standards. FIG. 1 further shows a small cell network comprising a plurality of small cell base stations (SeNB) $104_1$ to $104_5$ each operating within respective areas $106_1$ to $106_5$ (also referred to as coverage area) defining the small cells. The SeNBs $104_1$ to $104_5$ defining the small cells $106_1$ to $106_5$ may operate in frequency bands different from the frequency bands used in the macro cell network, for example in higher frequency bands, like the 3-5 Gigahertz band. The SeNBs $104_1$ to $104_5$ of the small cells $106_1$ to $106_5$ are controlled by the MeNB 100 are may be connected to the umbrella network (the MeNB 100) via respective backhaul links $110_1$ to $110_5$. FIG. 1 further shows a user equipment 112 receiving control signals from the MeNB 100 as is schematically depicted by arrow 114 and that communicates user data signals via one of the small cells as is depicted by arrow 116.

In wireless communication networks in general and also in the network shown in FIG. 1, energy savings and energy efficiency are of specific interest. For achieving such savings and efficiency, one or more of the SeNBs may be put to sleep or may be turned off when not in use. A UE cannot set up a communication with a sleeping SeNB, rather, it needs to connect for a communication directly with the MeNB 100. In the "ON" or "ACTIVE" state the SeNB is fully on and sends both user data to connected UEs and pilot symbols to enable new UEs to connect. The pilot symbols may be sent by the SeNBs to enable the UEs to differentiate the respective SeNBs. In the "OFF" or "SLEEP" state the SeNB is in a stand-by mode in which it can neither send nor receive any radio signals and consumes a non-negligible amount of power. The off or sleeping SeNB may be woken up by the MeNB 100, by appropriate signaling via the backhaul link 110. Problems arising with small cells being in the sleep mode will now be discussed with reference to FIG. 2 which shows the wireless system of FIG. 1. It is assumed that the small cell base stations (SeNBs) $104_1$, $104_2$ and $104_5$ are in the sleep mode, as is indicated by dashed circle indicating the respective small cells $106_1$, $106_2$ and $106_5$. The SeNBs $104_3$ and $104_4$ are active. In dense small cell deployments, putting unused small cells, like cells $106_1$, $106_2$, and $106_5$, to sleep provides benefits in terms of energy savings and reduced interference.

However, this also results in some problems. One problem is the small cell discovery. For UEs, like UE 112, it is a challenge to reliably discover sleeping small cells, because such cells either stop transmitting discovery signals or reduce the frequency of such a discovery signal transmission in order to save energy. In the absence of discovery signals, it becomes impossible for UEs to discover sleeping cells. For example, the UE 112 may not be aware that it is in the vicinity of the two sleeping small cells $106_1$ and $106_2$ if they are not transmitting discovery signals. Even though a reduced periodic transmission of discovery signals from a sleeping cell may improve discovery, the reliability of this process is low and involves a lot of energy on the part of both the small cell and the UE in order to improve discovery speed and reliability.

Another problem with sleeping cells is that it is not immediately clear which resources and capabilities should be activated in a discovered small cell when several options are available. In FIG. 2, the UE 112 may somehow discover one or both nearby sleeping cells $106_1$, $106_2$, however in both cases it may be suboptimal for the small cell to activate all its resources. The default approach of activating all resources and capabilities is suboptimal, since it can lead, at best, to an under utilization of the activated resources. For example, in the situation depicted in FIG. 2, the UE 112 is capable of operating in the frequency bands $f_1$ and $f_2$, however it cannot operate in the frequency band $f_3$ that is also provided by the small cells $106_1$ and $106_2$. Thus, activating in either of the small cells $106_1$ and $106_2$ the frequency band $f_3$ is not required for serving UE 112. Activating all resources may further result in a deterioration of the communication environment with regard to existing active communication links. When activating in either of small cells $106_1$ and $106_2$ all available frequency bands $f_1$ to $f_3$, an increased interference within an existing communication link may occur. In the situation depicted in FIG. 2, the already active small cell $106_3$ operates in the frequency band $f_1$, so that activating all frequency bands in the sleeping cells $106_1$ and $106_2$, including frequency band $f_1$, may lead to an undesired interference situation deteriorating the communication environment.

Yet another problem with regard to sleeping small cells is that the process of activating a sleeping small cell, its discovery and the acquisition of the proper system information to connect to an activated small cell may result in a long connection setup delay experienced by the UE 112 when trying to connect to a small cell that has just been activated from its sleep mode so that no quick connection setup is possible.

Several approaches have been proposed in conventional technology, for example in publications and standardization communities (see conventional-technology references [1] and [2]), to address the above referenced problems, however these problems mostly focus on addressing the problems of sleeping small cell discovery and may be grouped into three approaches.

The first approach may be referred to as an uplink-based signaling approach in accordance with which a sleeping cell monitors uplink transmissions by leaving its radio frequency (RF) receiving chain in the on state. Upon detecting some UE activity, the sleeping cell wakes up from the sleep mode and activates its transmission chain to start transmitting discovery signals. UEs in the vicinity can discover the small cell and initiate connection procedures. This approach may have some advantages as it supports autonomous small cell on/sleep behavior, however this comes with a number of disadvantages. One disadvantage is that the small cell needs to maintain its RF receiving chain activated, which compromises any potential energy savings in the sleep mode. Furthermore, this approach puts a lot of strain on the UE energy resources as the UEs need to transmit its signals frequently and on several frequency resources in order to improve the speed and reliability of triggering a nearby sleeping small cell to wake up.

Another approach known from conventional technology is referred to as a downlink-based signaling approach in accordance with which small cells which are in the sleep mode, periodically or in response to a trigger signal, transmit discovery signals to enable UEs to discover and initiate connection procedures. Upon discovery, subsequent procedures are performed to fully activate the sleeping small cell. Like the above described uplink-based signaling approach, also the downlink-based signaling approach has the advantage of supporting an autonomous small cell on/sleep behavior. However, like the previous approach, at the same time it suffers from the same drawbacks. In addition in a dense small cell deployment, the transmission of unique discovery signals from all small cell base stations, including those being in the sleep mode, significantly increases the search space for the UE which can then lead to discovery delays.

Yet another known approach is referred to as a location-based scheme which relies on previously stored information to estimate whether a UE is in the vicinity of a small cell. One approach relies on storing RF maps that correspond to various small cell locations and using measured or reported radio fingerprints from UEs to determine when the UE is in the vicinity of a small cell, as is for example described in conventional-technology reference [3]. Another approach relies on storing the actual locations of small cells and using geographic location reports from a UE to determine if there are any small cells in the vicinity of the UE, as is for example described in conventional-technology references [4], [5]. Both approaches may use an external entity, for example a macro base station, to wake up a sleeping small cell. In location-based schemes, the RF receiving and transmission chains of the sleeping small cells can be switched off completely, which maximizes the achievable energy savings. However, proper functioning of these schemes may use a training phase to obtain accurate reference data, which can cause disruptions to the service provided.

In addition to the above mentioned limitations, state of the art mechanisms for a small cell activation focus on making binary decisions on whether to wake up a sleeping cell or to leave it in the sleep mode. Very little attention is paid to the fact that a sleeping small cell and a UE may have many resources and capabilities which may use more complex decisions being made regarding the resource and the capabilities to activate a sleeping small cell for a communication with a target UE.

The above problems regarding the delayed connection setup between a UE and a small cell (that was not in the sleep mode) also occur in situations, where the UE needs to make a connection to a new small base station due to the time for the acquisition of the proper system information.

SUMMARY

According to an embodiment, a method for controlling a small cell base station in a wireless communication system having a plurality of small cell base stations controlled by a macro base station may have the steps of: requesting, by the macro base station, from a small cell base station an RF fingerprint on a specific resource; making, by the small cell base station, the RF fingerprint measurement with respect to the neighboring small cells for acquiring information describing a vicinity around the small cell base station; and reporting the RF fingerprint from the small cell base station to the macro base station.

According to another embodiment, a non-transitory digital storage medium having a computer program stored thereon which, when executed on a computer, carries out the method for controlling a small cell base station in a wireless communication system having a plurality of small cell base stations controlled by a macro base station, which method may have the steps of:

requesting, by the macro base station, from a small cell base station an RF fingerprint on a specific resource;

making, by the small cell base station, the RF fingerprint measurement with respect to the neighboring small cells for acquiring information describing a vicinity around the small cell base station; and reporting the RF fingerprint from the small cell base station to the macro base station.

According to another embodiment, a wireless communication system may have: a macro base station; and a plurality of small cell base stations controlled by the macro base station, wherein the macro base station and one or more of the small cell base stations are configured to operate in accordance with the method of claim 1.

1st Aspect—Sleeping Small Cell Discovery

In accordance with the first aspect of the present invention, a method for controlling a small base station in a wireless communication system is provided, wherein the wireless communication system comprises a plurality of small cell base stations controlled by a macro base station, wherein the method comprises:

obtaining, by a small cell base station, a measurement of signals from one or more neighboring small cell base stations ($104_2$) for obtaining information describing a vicinity around the small cell base station; and reporting the information from the small cell base station to the macro base station.

The present invention in accordance with the first aspect provides for a new approach for discovering one or more sleeping small cells in a network environment including a macro base station controlling a plurality of small base stations. In accordance with the first aspect of the present invention, by means of measurements made by the small cell base station, information describing a vicinity around the small cell base station is obtained, e.g. by applying a fingerprinting technique. In accordance with embodiments of the first aspect of the invention, this measurement may be performed under the control of the macro base station requesting one or more small cell base stations to obtain the information, e.g. the fingerprints. Alternatively, the measurements may be taken by a small cell base station independent of the macro base station, e.g. upon setting up the small cell base station as part of its self-configuration process, when changing its state or at fixed or variable intervals. Also, other network entities may signal the small cell base station to perform the measurement. This approach provides information allowing to detect a small cell base station from the plurality of small cell base stations controlled by the macro base station which has been put into the sleep mode. Techniques for obtaining information describing a vicinity around the small cell base station, like fingerprinting techniques, are basically known in the art, however such information (e.g. the fingerprints) is acquired by the UEs and is used for determining a position of a UE or for generating a geographical map at the macro base station. Such approaches are disadvantageous as they are based on information acquirement that is performed by the UEs. Contrary to such known approaches, the present invention in accordance with the first aspect is a macro-based approach in accordance with which the macro base station acquires from one or more of the small cell base stations information describing a vicinity around the small cell base station (e.g. fingerprints on at least one resource), thereby providing the macro base station with reliable information allowing to determine a small cell base station that has been put into the sleep mode once a UE needs to make a connection to one of the small cell base stations under the control of the macro base station.

In accordance with an embodiment of the first aspect of the present invention, the method comprises configuring, by the macro base station, the small cell base station with regard to the measurement. Configuring the small cell base station may comprise configuring the behavior of the small cell base station when the small cell base station changes between an active state and a sleep state. The small cell base station, when it changes between an active state and a sleep state, may be configured to stop the measurement, store the last configuration and resume the measurements after wake up, or stop the measurement and discard the configuration, or stop the measurement, store the last configuration and resume the measurement upon explicit signaling from the macro base station, or continue the measurement.

In accordance with an embodiment of the first aspect of the present invention, the method comprises configuring, by the macro base station, the small cell base station with regard to the measurement, wherein configuring the small cell base station may define one or more of a behavior of the small cell base station, a measurement object, a report configuration, and a quantity to be reported. The measurement object may comprise one or more of the frequency resource, the radio access technology, the time resource, the small cell base stations and/or the macro base stations. The report configuration may comprise one or more of the report contents, the reporting triggers, and/or the reporting periodicity. The quantity to be reported comprises one or more of a signal strength metric, like RSRP, RSRQ, SIR, SINR, CQI, RSSI, and/or an identity of an entity discovered, like PCID, BCID, unique CID.

In accordance with an embodiment of the first aspect of the present invention, the method comprises configuring, by the macro base station, the small cell base station with regard to the measurement, wherein the small cell base station is configured by the macro base station upon a connection establishment between the small cell base station and the macro base station.

In accordance with an embodiment of the first aspect of the present invention, the small cell base station sends an acknowledgement to the macro base station once the configuration is successfully received at the small base station.

In accordance with an embodiment of the first aspect of the present invention, the small cell base station reports the measurement to the macro base station upon a connection establishment between the small cell base station and the macro base station. This is advantageous as at any time a new small base station to be controlled by the macro base station is added, information describing a vicinity around the added small cell base station is obtained and provided to the macro base station, thereby continuously updating the information available at the macro base station also when the configuration of the network changes by adding additional small cell base stations.

In accordance with an embodiment of the first aspect of the present invention the small cell base station sends the report even if no information describing a vicinity around the small cell base station is obtained by the small cell base station.

In accordance with further embodiments of the first aspect of the present invention, the macro base station, e.g. upon a connection establishment between the small cell base station and the macro base station, may issue a request to the small cell base station to take the measurement for obtaining information describing its vicinity. The measurement may obtain a fingerprint on one or more resources. This approach is advantageous as at any time a new small base station to be controlled by the macro base station is added, a respective request is issued, thereby providing the macro base station with a fingerprint from the new small cell base station, thereby continuously updating the information available at the macro base station also when the configuration of the network changes by adding additional small cell base stations.

The request issued by the macro base station may define one or more of a measurement object, a measurement periodicity and configuration information for the small cell base station. The configuration information for the small cell base station may define one or more of a configuration of a report for reporting the measured fingerprint from the small cell base station, and a behavior of the small cell base station. The configuration of the report may define when the report is to be sent from the small cell base station to the macro base station and/or the contents of the report. The configuration, in accordance with embodiments, may define one or more of a time following the receipt of the request at the small cell base station after which the report is sent, a periodicity of sending the report, a maximum number of reports, and specific events triggering the sending of the report. The specific events may be any time a new fingerprint appears and remains longer than a pre-defined time period, any time an existing fingerprint disappears for longer than a predefined time period, and/or anytime an existing fingerprint changes.

The above described embodiments in accordance with the first aspect of the invention are advantageous as they allow for a macro-cell based approach for obtaining information allowing to reliably discover sleeping small cells from a plurality of small cells controlled by the macro base station in case a UE wants to make a connection to one of the plurality of small cells controlled by the macro base station. The embodiments are advantageous as they allow the macro base station to configure the small cell which is under control of the macro base station in such a way that the kind of measurement, the timing of the measurement and the reporting of the measurements are controlled by the macro base station so that it is ensured that the macro base station, at any time, receives from a small cell base station actual information (e.g. an actual fingerprints) describing its vicinity. Further, by means of the present invention in accordance with the first aspect, it is ensured that the information provided to the macro base station represents the actual situation. For example in situations where small cells adjacent to the considered small cell are put into the sleep mode, a change is detected due to the periodic measurement and the updated information is provided by the considered small cell to the macro base station.

In accordance with further embodiments of the first aspect of the invention, for determining a sleeping small cell base station in the wireless communication system for serving a user equipment, wherein the method further comprises:

in response to a request from the macro base station to the user equipment, taking, by the user equipment, a measurement for obtaining information describing a vicinity around the user equipment; and reporting the measured information from the user equipment to the macro base station.

In accordance with embodiments, based on the reported information (e.g. a reported fingerprint) from the user equipment and based on information characterizing the vicinity of the plurality of small cell base stations under the control of the macro base station, one or more sleeping candidate small cell base stations within the vicinity of the user equipment are identified from the plurality of small cell base stations.

The identification, in accordance with embodiments, may be carried out at the macro base station, however the first aspect of the present invention is not limited to such approaches, rather the identification might also be carried out at other locations in a wireless communication network.

This embodiment of determining a sleeping small cell in accordance with the first aspect of the invention is advantageous when compared to conventional RF fingerprint-based schemes for a small cell discovery, as the macro cell (macro base station) may coordinate all transmissions, measurements and the reporting. This is advantageous as it increases the discovery reliability and reduces the search space to uniquely identify small cells. When compared to known downlink- or uplink-based signaling schemes this is advantageous. Downlink-based signaling approaches involve that sleeping cells periodically broadcast reference signals to aid in the discovery, and uplink-based signaling approaches involve that the sleeping cells "listen" to any communication from a potential UE. Such activities by the sleeping cells are not necessary in accordance with the present invention. Rather, the macro base station is provided with an actual fingerprint of the vicinity of a small cell which, when it is determined that a UE entered the area controlled by the macro base station, is used for determining, on the basis of an RF fingerprint obtained from the UE, one or more possible small cells which are in the sleeping mode which could be put into the active mode, and one or more of the detected sleeping small cells are finally selected and activated, wherein activation may be done in accordance with conventional approaches or may be done in accordance with one of the subsequently discussed further aspects of the present invention.

$2^{nd}$ Aspect—Small Cell Detection and Channel Quality Determination on Candidate Resources In accordance with the second aspect, the present invention provides a method for controlling a small cell base station and a user equipment to be served by the small cell base station in a wireless communication system comprising a plurality of small cell base stations controlled by a macro base station, the method comprising:

in response to a request from the macro base station to the small cell base station, performing, by the small cell base station, a beacon transmission on one or more specific candidate resources;

in response to a request from the macro base station to the user equipment, performing, by the user equipment, a channel quality measurement on the one or more specific candidate resources which have also been signaled to the candidate small cell base station; and reporting the measured channel quality from the user equipment to the macro base station.

Conventional approaches for determining resources to be used in a wireless communication between a base station and a user equipment perform a channel estimation directly between the communication partners, namely the user equipment and the base station. This is disadvantageous as it involves an initial communication among the communication partners starting at the user equipment with a requirement for detecting a pattern from a base station to which a communication link is to be established. Only once the communication partner has been detected, the further exchange of information can be done for determining the channel quality on the basis of which the resources to be activated and used for the communication may be determined. This approach leads to undesired delays in the communication setup. Contrary to such conventional approaches, the present invention, in accordance with the second aspect is advantageous as it provides an improved approach for determining the most suitable resources to be used for a communication between a small cell base station and a user equipment. More specifically, the present invention is a macro cell based approach in accordance with which the macro cell coordinates the activities to be taken by the actual communication partners, namely the small cell base station and the user equipment. The macro base station may signal to the small cell base station specifics of the beacon transmission, for example signals that can be easily recognized only by the UE of interest. The macro base station initiates at the UE the measurement of the channel quality on the basis of the transmitted beacon signals, thereby obtaining channel quality information.

In accordance with embodiments of the second aspect, the method may further comprise configuring the small cell base station by the macro base station, to periodically report resource usage, and/or to configure the small cell base station to send its capabilities to the macro base station upon a connection establishment with the macro base station or upon request from the macro base station. This embodiment is advantageous as it allows taking into consideration the resource capabilities of a small cell and provide for an optimal resource usage upon connection setup of a cell.

In accordance with embodiments of the second aspect, the request issued by the macro base station to the small cell base station defines one or more of the beacon format, the beacon transmission configuration, and the small cell behavior. The beacon format may be specific with regard to the small cell base station or the user equipment. The beacon transmission configuration may comprise a transmission for a predefined time period on one or multiple resources. The small cell base station behavior may comprise sending an acknowledgement to the macro base station once the configuration is successfully received. In accordance with embodiments, in case the small cell base station does not support simultaneous beacon transmissions on multiple resources, the beacon transmission configuration may comprise the timing and order of beacon transmissions on different resources. Further, a reference timing may be defined by a macro base station frame. The above embodiments are advantageous as the macro base station coordinates the beacon transmission at the small cell base station, more specifically the macro base station defines which of the small cells transmit, when they transmit, and on what resources. Also the type of discovery signals transmitted is determined by the macro-cell base station.

In accordance with further embodiments of the second aspect, the request issued by the macro base station to the user equipment defines one or more of a beacon measurement configuration, a beacon measurement reporting configuration, a user equipment behavior and/or the contents of a report for reporting the measured channel quality of the user equipment to the macro base station. In accordance with embodiments the beacon measurement configuration may comprise a measurement object, like a frequency resource, a pilot pattern and a timing used for the measurement. The beacon measurement reporting configuration may comprise a timer value indicating a time following the receipt of the request at the user equipment after which the report is to be sent. In accordance with embodiments, the user equipment behavior may comprise sending a report even if one or more specified resources are not detected upon expiry of a timer. In accordance with further embodiments, the user equipment behavior may comprise one of sending a report before expiry of the timer if all resources have been detected and measured, and/or sending a report after expiry of the timer, even if all resources have been detected and measured. The contents of the report may comprise a signal strength and/or one or more quality measures, like RSRP, RSRQ, RSSI, CQI, SIR, SINR, in an order specified by the configuration. The above embodiments are advantageous as the macro base station signals to the user equipment, which is to perform the channel quality measurement, information about the beacon transmission and how the measurement report should be provided, thereby avoiding the need at the user equipment to detect a specific pattern, rather the pattern used by the candidate small cell base station to which a connection is to be setup, is signaled to the user equipment which can be readily used for making the desired measurement, thereby avoiding unnecessary delays for carrying out the actual channel quality measurement.

The second aspect of the present invention may be used together with the first aspect for determining the resources to be used by a small cell that has been activated from its sleep mode after it was detected in accordance with the first aspect. However, it is noted that the present invention in accordance with the second aspect can be used independent of the first aspect, for example in any situation where an active small cell base station is present and a new UE desires to setup a connection with this small cell base station, or in cases where the small cell was activated from its sleep mode using conventional approaches.

$3^{rd}$ Aspect—Interference Determination on Candidate Resources

In accordance with a third aspect, the present invention provides a method for interference control among a first small cell base station and a second small cell base station in a wireless communication system comprising a plurality of small cell base stations controlled by a macro base station, the method comprising:

in response to a request from the macro base station to the first small cell base station, performing, by the first small cell base station, a beacon transmission on one or more resources;

in response to a request from the macro base station to the second small cell base station, performing, by the second small cell base station, a channel quality measurement on the one or more resources; and reporting the measured channel quality from the second small cell base station to the macro base station.

In conventional approaches for interference determination in wireless communication systems a base station either actively coordinates the resource usage by a communication via a backhaul connection to neighboring base stations, or the base station, like a femto base station, is passive in that it listens to the vicinity and selects resources which, from the listening of the vicinity, are judged to not be used by other, neighboring base stations. Contrary to the conventional-technology approaches known, the present invention in accordance with the third aspect is advantageous as it does not require the small base station to provide for an active communication which may not be possible in case no backhaul link to a neighboring small base station is available. Also no passive listening is required, rather, in accordance with the present invention, a macro-cell coordinate approach for interference control is taught, in accordance with which the macro cell coordinates the transmission and reception of beacon signals among the candidate small cell base station (first small cell base station) and one or more potential interfering small base stations (second small cell base station) in the vicinity of the candidate small cell base station. No inter-cell communication between the candidate and interfering small cells is required. Also, the interfering base station needs not to identify and determine signals from the candidate base stations.

In accordance with embodiments of the third aspect, the method comprises configuring the first small cell base station, by the macro base station, to periodically report resource usage, and/or configuring the first small cell base station to send its capabilities to the macro base station upon connection establishment with the macro base station or upon request from the macro base station. This embodiment is advantageous as it allows taking into consideration the resource capabilities of the small cell base stations and also providing for an optimal resource usage together with an increased measurement and detection reliability and a reduced search space in which the small cells can be detected.

In accordance with embodiments, the request issued by the macro base station to the first, candidate small cell base station defines the beacon format, the beacon transmission configuration, and/or the first small cell base station behavior. In accordance with embodiments, the beacon format may be specific with regard to the first small cell base station or the second small cell base station. The beacon transmission configuration may comprise a transmission for a predefined time period on one or multiple resources. The first small cell base station behavior may comprise sending an acknowledgement to the macro base station once the configuration is successfully received. The first small cell base station may not support simultaneous beacon transmissions on multiple resources, and in such a situation, in accordance with an embodiment the beacon transmission configuration may define a timing and an order of beacon transmission on different resources. Further, a reference timing may be defined on the basis of a macro base station frame. By means of the present invention and in accordance with the above embodiments of the third aspect, the macro base station signals to the candidate small cell base station the specifics of the beacon transmission in terms of its format, the configuration and how the candidate small cell base station should behave in response to the request, which is advantageous as the macro cell coordinates not only the beacon transmission of a single small cell base station but also controls a plurality of other small cell base stations so that dependent on the knowledge about the other small cell base stations the beacon format and beacon transmission configuration can be configured in a way that takes into consideration also other possible transmission made by other small cell base stations.

In accordance with embodiments, the request issued by the macro base station to the second (the interfering) small cell base station defines a beacon measurement configuration, a beacon measurement reporting configuration, a small cell base station behavior, and/or the contents of a report for reporting the measured channel quality from the second small cell base station to the macro base station. In accordance with embodiments, the beacon measurement configuration may comprise a measurement object, like a frequency resource, a pilot pattern and a timing used for the measurement, and/or measurement gaps. The beacon measurement reporting configuration may comprise a timer value indicating a time following the receipt of the request at the second small cell base station after which the report is to be sent. In accordance with embodiments the behavior of the second small cell base station may define sending a report even if one or more specified resources are not detected upon expiry of a timer In accordance with further embodiments, the user equipment behavior may comprise one of sending a report before expiry of the timer if all resources have been detected and measured, and/or sending a report after expiry of the timer, even if all resources have been detected and measured. In accordance with embodiments, the contents of the report may comprise a signal strength and/or one more or more quality measures, like RSRP, RSRQ, RSSI, CQI, SIR, SINR, in an order specified, for example, in the configuration information received from the macro base station. The present invention in accordance with the third aspect is advantageous as the interfering small cell base station is provided with the information about the actual signal transmitted by the candidate small cell base station so that the interfering small cell easily recognizes the candidate small cell, thereby avoiding unnecessary delays. Also, the correct resources, which are also used by the candidate small cell and which are decisive for determining the interference situation, are signaled to the interfering base station, thereby ensuring a fast, flexible and reliable measurement of the channel quality between interfering base stations, thereby allowing for an improved and more reliable determination of an interference situation and an improved determination of resources that may be used at the candidate small cell base station.

With regard to the third aspect it is noted that it may be used together with the first and/or second aspect of the present invention as described above and/or the following aspect described below, for example for providing interference information after a sleeping cell has been put into its active state and resources for communication with a UE have been determined. However, the third aspect of the present invention may also be used independent of the first and second aspect, for example for providing among two active small cell base stations interference information for determining resources that may be used for serving, by the candidate small cell base station, a user equipment that requested setup of a connection to the candidate small cell base station. Also it is possible to use the second and third aspect of the invention approach in combination for defining the resources to be used for serving a user that requested setup of a connection to the candidate small cell base station already active or which had been put into the active state by conventional approaches known in the art.

$4^{th}$ Aspect—Optimum Resource Configuration

In accordance with the fourth aspect, the present invention provides a method for controlling a user equipment to be served by a small cell base station in a wireless communication system comprising a plurality of small cell base stations controlled by a macro base station, the method comprising:

signaling, by the small cell base station, the small cell base station capabilities to the macro base station;

signaling, by the user equipment, the user equipment capabilities to the macro base station;

signaling, by the macro base station, a small cell base station configuration to the user equipment, and accessing the small cell base station by the user equipment using the small cell base station configuration received from the macro base station.

In conventional approaches, when a user equipment desires to setup a connection to a base station, first of all it needs to somehow detect the base station, and a communication between the base station and the user equipment may take place so that, finally, the resources to be used for the communication can be detected. This, for example, takes place when a handover occurs, namely when serving of the user equipment by a first base station changes to a second base station. The occurrence of a handover is signaled from the current base station to the new base station which then determines the new resources which are sent back to the user equipment via the current base station, so that once this information is received, the user equipment is in a position for making a connection to the new base station. However, this approach may result in delays which are undesired. To avoid such problems, in accordance with the present invention, a macro cell based approach is suggested in accordance with which the small cell base station signals its capabilities to the macro base station, and the user equipment signals its capabilities to the macro base station. On the basis of the received information, a small cell base station configuration may be determined, e.g. at the macro base station or at another entity of the network environment. The macro base station signals the small cell base station configuration to the user equipment, thereby avoiding unnecessary processing delays, for example during a handover. This approach is advantageous as it is no longer necessary, as in conventional technology, that the user equipment uses several inputs, like an uplink signal strength, mobility and the like, to determine the best adjacent small cell for a handover, rather the macro base station configures the optimal resources in a selected small cell. Embodiments of the fourth aspect of the invention are advantageous, as by means of the macro cell based approach, the resource capabilities of candidate small cells and UEs are explicitly taken into account to determine resource configurations to be activated, thereby providing for a more efficient way for determining the resources to be used for the communication between the small cell base station and the user equipment. Accessing the small cell base station by the user equipment using the small cell base station configuration received from the macro base station is advantageous as it is no longer required by the user equipment to determine all information for the setup of the connection by a communication with the small cell base station. Rather, the information already received from the macro base station can be used, thereby accelerating the setup and avoiding unnecessary delays.

In accordance with embodiments, the method comprises determining on the basis of the capabilities signaled from the small cell base station and the user equipment, the small cell base station configuration to be signaled to the user equipment. The method may further comprise sending, by the macro base station, the small cell base station configuration to the small cell base station. The small cell base station may send an acknowledgement to the macro base station once the configuration is successfully received.

In accordance with embodiments, the small cell base station and the user equipment signal their capabilities to the macro base station upon a request from the macro base station or upon a connection establishment with the macro base station.

In accordance with embodiments, the method comprises sending, by the user equipment, an acknowledgement to the macro base station once the configuration is successfully received.

In accordance with embodiments of the fourth aspect, the method may comprise signaling to the macro base station, by the user equipment and in response to an indication from lower layers of the communication protocol, that a connection has been established with the small cell base station, and/or signaling to the macro base station by the user equipment and in response to an indication from lower layers of the communication protocol not being received after a predefined timer period, that no connection has been established with the small cell base station. This is advantageous as it allows the macro base station to confirm that the configuration is successfully received and that a connection is finally set up from the user equipment to the small cell base station or not so that in case a problem is determined, the macro base station can take appropriate action, for example, sending again the small cell base configuration to the user equipment or selecting another small cell, thereby accelerating the connection of the user equipment to a small cell base station among the plurality of small cell base stations available.

In accordance with embodiments, the method may comprise signaling to the macro base station, by the small cell base station and in response to an indication from lower layers of the communication protocol, that a connection has been established with the user equipment; and/or signaling to the macro base station, by the small cell base station and in response to an indication from lower layers of the communication protocol not being received after a predetermined time period, that no connection has been established with the user equipment. This is advantageous as it allows the macro base station to react to possible problems in the small cell base station, for example, in a situation where the handover failed so that another small cell base station can be selected for the handover.

In accordance with embodiments, the small cell base station configuration signaled to the user equipment comprises one or more resources used by the small cell base station, like a time, a frequency, a space, a code, an interleaver; a numerology used by the small cell base station, like a frame structure, a timing scheme, a subcarrier spacing, a filter; and/or a timer value. This is advantageous as it provides the UE with all information that may be used for setting up a connection to the candidate small cell base station without the need for any activities by the user equipment for determining the configuration information from the base station itself, thereby expediting and accelerating the connection setup.

With regard to the fourth aspect of the present invention, it is noted that this aspect may be used together with either of the preceding first to third aspects. However the present invention is not limited to this, rather the present invention in accordance with the fourth aspect may also be used independent of the first to third aspects, for example in a conventional system including a macro base station controlling a plurality of small cell base stations.

Advantages of the $1^{st}$ to the $4^{th}$ Aspect

The above described four aspects of the present invention define a new, improved macro-cell assisted approach for small cell discovery and resource activation which, when compared to conventional approaches, is advantageous. When compared to conventional RF fingerprint-based schemes for small cell discovery, the present invention according to the different aspects provides a macro cell based approach in which the macro base station coordinates transmission, measurements and reporting which results in an increased discovery reliability, and a reduced search space to uniquely identify small cells. Further, the resource capabilities of candidate small cells and UEs are explicitly taken into account for determining resource configurations to activate. Also, an optimal resource usage is achieved as well as an improved information transfer to the UE, thereby facilitating a quick connection setup to a small cell, for example a small cell that has been activated from its sleep mode or to a small cell that has already been active. Further, in accordance with the present invention as described above, the behavior regarding the signaling, the transmission, the measurements and the reporting are controlled by the macro base station and the respective entities, namely the small cell base stations and the user equipments are configured accordingly.

When compared to conventional downlink/uplink-based signaling approaches, the present invention is advantageous as the small cell base stations do not require broadcasting reference signals for a discovery or listening to traffic or communications in neighboring small cells for potential communications with UEs requesting a setup with the candidate small cell. Rather, by means of the macro based approach, the macro base station configures which small cells transmit, when they transmit and what resources they transmit, and also the type of discovery signals they transmit is used. The small cell signal transmission and the small cell or UE measurements are coordinated by the macro base station, thereby obtaining an increased measurement and detection reliability within a reduced search space to uniquely detect small cells. Also when compared to conventional handover implementations which use several inputs like the uplink signal strength, the mobility and the like, to determine the best adjacent cell to handover a user equipment, the present invention is advantageous as by means of the macro cell based approach, the macro base station configures the optimal resources in a selected small cell for the handover, thereby avoiding unnecessary delays and unnecessary traffic.

BRIEF DESCRIPTION OF THE DRAWINGS

Embodiments of the present invention will be detailed subsequently referring to the appended drawings, in which.

DETAILED DESCRIPTION OF THE PREFERRED EMBODIMENTS

In the following, embodiments of the present invention will be described in further detail. It is noted that the four aspects of the present invention will be described in the following in a single environment making use of all four aspects, however it is noted that each of the four aspects may also be used independent of the other aspects.

Figure 3:
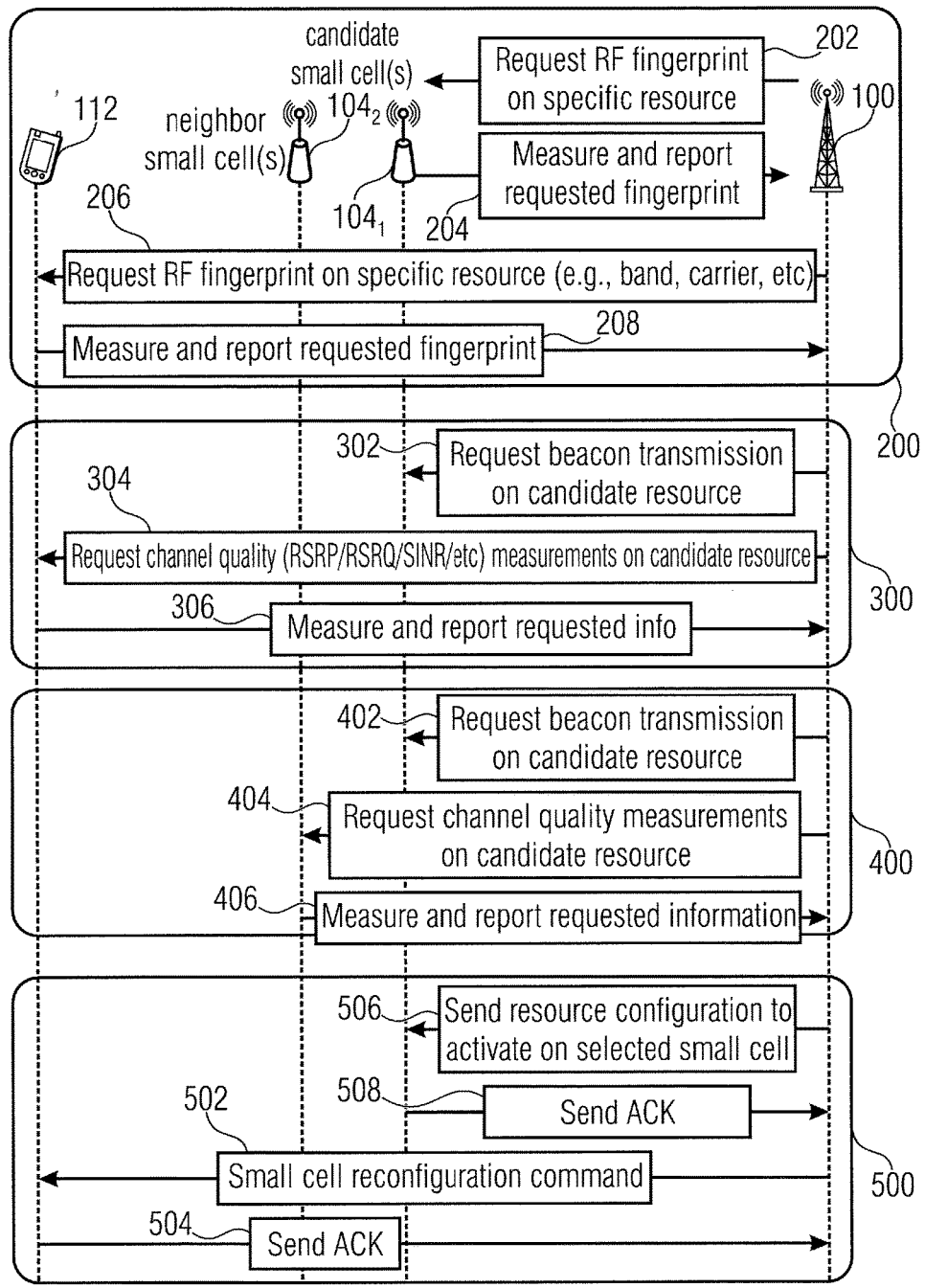
FIG. 3 illustrates the signaling flow for a macro-cell assisted small cell discovery and resource activation in accordance with various embodiments.

FIG. 3 illustrates the signaling flow for a macro-cell assisted small cell discovery and resource activation in accordance with various embodiments. Embodiments of the invention concern the field of overlaid network architectures including a macro cell and a dense deployment of small cells which address high capacity demands in radio access networks. Energy saving functionality enables unused small cells to be put to sleep which is an aspect in terms of energy savings and interference management. The invention, in accordance with the various aspects described below, introduces a macro assisted mechanism to facilitate controlling small cells and user equipment in such an overlaid network architecture, for example for the discovery of suitable cells to wake up and to serve a given UE, and for selecting appropriate resources to be assigned to active small cells or to small cells which have just been activated, taking into account small cell capabilities and resource usage in the neighborhood of a selected small cell. These mechanisms are based on macro-coordinated information requests, UE and small cell measurements, information processing at the macro cell or at another part of the architecture and sending configuration commands from the macro cell to the UE and the small cell. The present invention implements a mechanism that facilitate a quick and reliable connection setup between a UE and a small cell which, as a consequence, improves the speed and reliability of suitable small cell discovery and connection setup and, at the same time, reduces the UE and small cell energy requirements for small cell discovery in sleep mode. The mechanism also enables the optimal use of UE and small cell resources.

In the following embodiments, reference will be made to UE capabilities and small cell capabilities. In accordance with the embodiments, these capabilities are provided as input to the macro base station for implementing the inventive functionality. The information and the means by which the macro base station obtains the UE capabilities and the small cell capabilities may be as follows. For obtaining UE capabilities, the UE may signal its capabilities to the macro base station as a part of its initial connection setup to the macro cell. Alternatively, the macro base station may request information about specific capabilities directly from the UE or infer some capabilities based on the observed behavior of the UE. The capabilities of the UE may be stored, either permanently or temporarily, in a location at the macro base station for quick reference. The small cell capabilities may be obtained by the macro base station in various forms. In accordance with one embodiment, the capabilities of the small cell base station, for example the carriers or bands supported, the radio access technologies (RATs) supported, the technology supported, and the like, may be signaled to the macro base station when the small cell base station is first connected to the network. Updates may be configured by the macro base station, for example, the small cell base station may send a capability status message as part of the wake up procedure. The message may indicate that nothing has changed with regard to the base stations capabilities or only the differences in capabilities when compared to the last time the station went to sleep may be reported. The macro base station may also configure the small cell base station to send updates based on certain triggers, for example the updates may be event based, for example when a new capability is added or when an existing capability is removed or becomes unavailable, for example as a result of a defect. Also periodic updates are possible for providing regular reports about any changes to the capabilities. Alternatively, the macro base station may explicitly request a small base station to report all of its capabilities. In other embodiments, the macro base station may infer the capabilities of the small cell base station based on its behavior/responses to certain requests. The macro base station may learn the capabilities of the small cell base stations from UEs that connect to these small cells, for example by sending an explicit request to the UE and signaling from the UE a report of capabilities used in the small cells to the macro base station. Alternatively, the macro base station may obtain the information that may be used through a central entity that maintains such information. The information about the small cell capabilities may be stored, permanently or temporarily, by the macro base station to facilitate a quick lookup.

$1^{st}$ Aspect—Sleeping Small Cell Discovery

In FIG. 3 block 200 illustrates schematically the signaling flow for an embodiment in accordance with the first aspect of the present invention for obtaining information describing a vicinity around a small cell base station allowing to determine an available small cell among the plurality of small cells controlled by the macro base station. In the following embodiment the information describing a vicinity around a small cell base is a fingerprint obtained by a small cell base station by performing a measurement on one or more resources used by one or more neighboring small cell base stations. It is noted that the invention is not limited to obtaining RF fingerprints by the small cell base station, rather, also other techniques for obtaining information describing a vicinity around a small cell base station may be applied. Obtaining the information may include taking or obtaining a measurement from one or more small cell base stations around the small cell base station performing the measurement. The measurement yields values of one or more predetermined quantities from the one or more neighboring small cells.

FIG. 3 shows the macro base station 100, one or more candidate small cells $104_1$ and one or more neighboring small cells $104_2$. At step 202, the macro base station 100 requests from the candidate small cell $104_1$ an RF fingerprint on a specific resource. At 204, the small cell $104_1$ makes the fingerprint measurement with respect to the one or more neighboring small cells $104_2$ (e.g. obtains or measures values of one or more predetermined quantities from one or more neighboring small cells) and reports the requested fingerprint to the macro base station 100. In accordance with the first aspect of the present invention, by means of the fingerprint measured and reported by the candidate small cell $104_1$ information is provided that allows determining sleeping small cells in accordance with further embodiments of the first aspect. Contrary to conventional approaches where fingerprints are obtained by the user equipment, in accordance with this embodiment, a fingerprint is obtained under the control of the macro base station 100 from the candidate small cell 104₁. The obtained fingerprint characterizes the vicinity of the small cell 104₁ which is under control of the macro base station 100.

Steps 202 and 204 may be performed upon the establishment of a connection between the small cell 104₁ and the macro base station 100, for example when the small cell base station 104₁ first joins the network. In accordance with embodiments, the request transmitted at step 202 allows the macro base station 100 to configure the small cell base station 104₁ with regard to the measurement object, like the frequency, time slots and resources used. Also, white lists or black lists may be included indicating for example radio transmitters in the vicinity of the candidate small cell 104₁ which are to be measured (white list) or which are not to be measured (black list), which may be advantageous, e.g., in situations when a moving small cell base station is detected from which it is assumed that it will only stay for a very short period within the area served by the macro base station 100 and, therefore, can be disregarded. Also, in case there are small cell base stations in the vicinity of the candidate small cell base station which are recognized to be somewhat "nervous", i.e., to rapidly change between an active and an inactive (sleep) state it may be desired to disregard such candidate small cells when generating the fingerprint. In addition, the request sent at step 202 may include an indication to the small cell base station 104₁ defining a measurement periodicity, i.e., indicating how often and at what intervals a fingerprint measurement should be carried out by the candidate small cell 104₁. The periodicity may be determined by the macro base station 100 based on the macro base station's knowledge of the overall network. In addition, at step 202 a reporting configuration may be submitted to the candidate small cell 104₁ configuring the small cell base station as to the instances when a report is to be generated and forwarded to the macro base station. In accordance with an embodiment, a one shot configuration may be signaled to the small cell base station meaning that a report is to be generated at a predetermined time after receipt of the request. Also a periodic reporting may be configured, and the periodicity and the maximum number of reports may be indicated. Also, the small cell base station may be configured to report updates of the fingerprint based on certain triggers, for example anytime a new fingerprint appears and stays for longer than a predefined time period, or any time an existing fingerprint disappears for longer than a predefined time period, or in case the actual fingerprint somehow changes.

Further, at step 202 the macro base station 100 may signal to the candidate small cell base station 104₁ information defining the content to be included into the report, for example specific quantities that need to be reported in the response at step 204, like specific signal strength metrics, for example a reference signal received power (RSRP), a reference signal received quality (RSRQ), a signal to interference ratio (SIR), a signal-to-interference-plus-noise ratio (SINR), a channel quality indicator (CQI), or the received signal strength indication (RSSI). The identity of an entity discovered may also be included into the report, for example on the basis of the physical layer cell identity (PCID), the base station cell identity (BCID), or a unique cell identifier (CID). Further, it may be defined to what entities the report should be sent to, either only to macro cells or to both macro and small cells.

In addition, at step 202, together with the request, information may be forwarded that define how the small cell 104₁ should operate in case it changes from an active state to a sleep state. It may be desired that the small cell base station stops the measurements and stores the last configuration received from the macro base station at step 202 and resumes its activity with regard to the determination of a fingerprint after wake up. Alternatively, the small cell base station may stop the measurement and discard the configuration so that after wake up it needs to receive a new request from the macro base station including the useful configuration information. Also it may be desired that the measurements are stopped, that the last configuration is stored, however, measurements are only resumed once a respective request is again received from the macro base station. As a further alternative, it may be indicated to the small cell base station to simply continue measurements after the wake up. In accordance with embodiments, the small cell base station 104₁ may send an acknowledgement when the configuration has been successfully received. The small cell may also send a report even if no fingerprints are discovered.

In addition to the initial sending of the request at step 202, in accordance with embodiments the macro base station 100 may explicitly request the small cell base station 104₁ to make measurements and to send reports when the macro base station determines that specific conditions are satisfied, for example when all small cells in the vicinity of the candidate small cell are activated, when a small cell joins the network or the like.

With regard to the above mentioned active mode or sleep mode of a small cell it is noted that a small cell is considered to be in the sleep mode when it does not show any radio transmission activities, and is considered to be active when the radio transmission is active.

Figure 2:
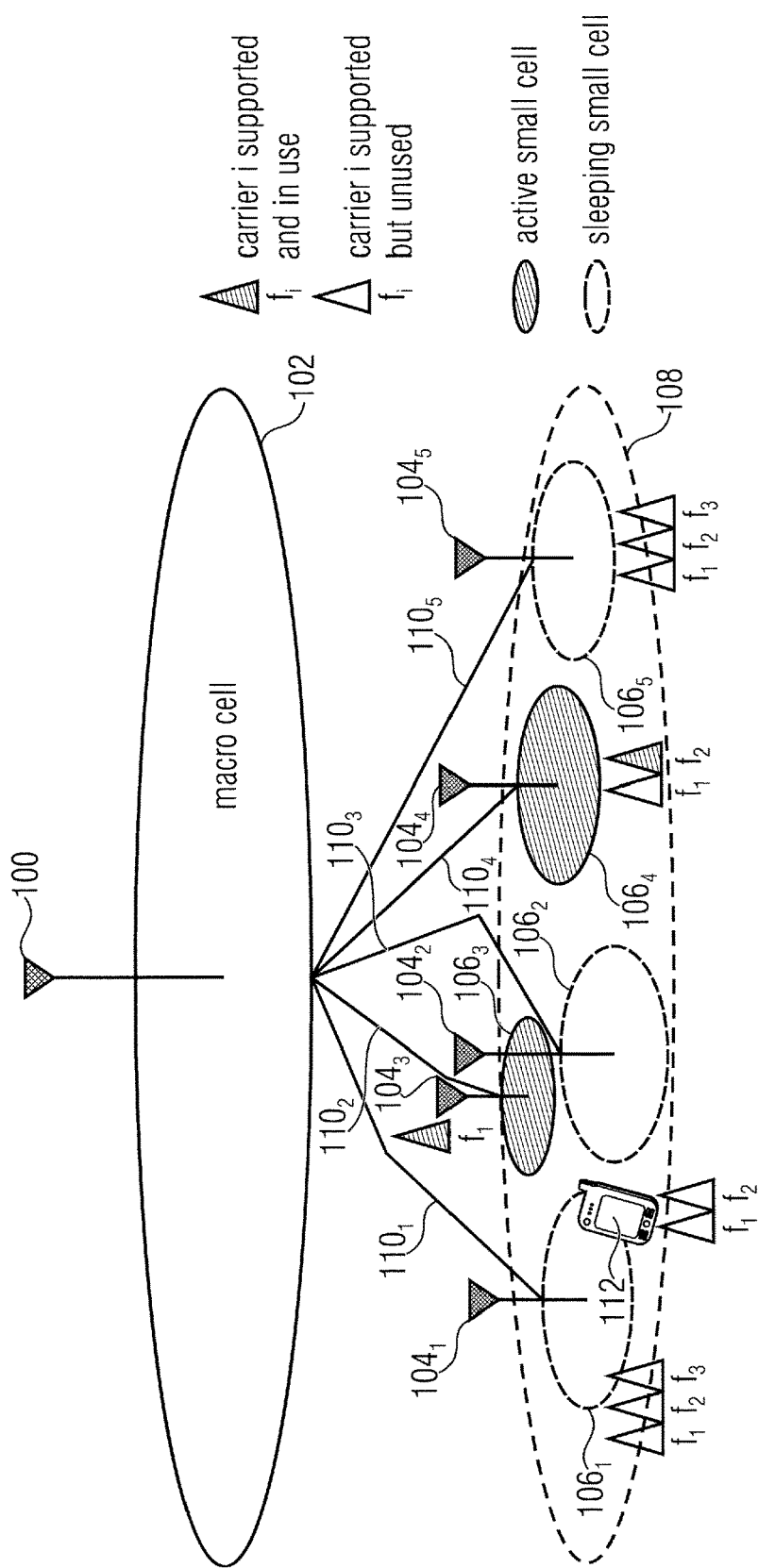
FIG. 2 shows the wireless system of FIG. 1 for illustrating potential problems arising with small cells being in the sleep mode.

In accordance with embodiments, the macro base station 100 may include a reference data base of RF fingerprints or RF maps that characterize the vicinity of each small cell under the control of the macro base station. In accordance with further embodiments of the first aspect, this information is used to facilitate the process of identifying suitable cells within the vicinity of a user equipment. In block 200 of FIG. 3, this further embodiment of the first aspect is described. When a user equipment 112 enters into the area controlled by the macro base station 100, the macro base station, at step 206, sends a request to the user equipment 112 requesting the user equipment 112 to obtain an RF fingerprint on a specific resource, for example a frequency, a band, a carrier and the like. The user equipment 112 at step 208 measures the requested fingerprint and reports the requested fingerprint back to the macro base station 100. On the basis of the fingerprints obtained at steps 202, 204 and on the basis of the fingerprints obtained at steps 206, 208 one or more sleeping small cell base stations in the vicinity of the user equipment 112 may be detected, for example small base stations 104₁ and 104₂ in FIG. 2, which may be activated for serving the user equipment 112.

The macro-assisted discovery of the most suitable small cell within the vicinity of the UE 112, in accordance with steps 206 and 208, addresses the issue of identifying suitable small cells within the vicinity of the UE. The macro base station 100 requests the UE 112 to measure an RF fingerprint on a specific resource. The resource may be a frequency band, a carrier or the like. The request may be initiated by the macro base station based on a number of triggers, for example, it may be initiated for any UE that establishes a connection with the macro base station, or it may be initiated when the macro base station determines that a UE needs to be handed over to another small cell base station due to a poor signal quality in the communication between the current base station and the UE, or in case the macro base station becomes overloaded.

In accordance with embodiments, the request sent at step 206 may combine measurement requests for several resources, the conditions under which the measurements need to be performed or skipped and the conditions under which the measurements need to be reported. Further, the macro base station 100 may configure appropriate measurement gaps for the UE to perform the requested RF measurements, i.e. "interrupt" the normal operation of the UE to allow for the time that may be used for making the RF measurements.

The macro base station may configure the measurement behavior of the UE 112 based on the nature of the request, i.e. the UE may be configured to measure all resources in the request periodically for a given time period, or periodically until receiving from the macro base station a request to stop the measurement. The UE may also be configured to measure certain resources based only on the results of other measurements, for example periodically for a given period or periodically until receiving a request from the macro base station 100 to stop the measurement.

The macro base station may further configure the UE with regard to an appropriate reporting behavior based on the nature of the request. The UE may be configured to report all measurements during every measurement period, or it may report all measurements only at the end of the measurement period. In addition or alternatively, measurements may be reported based on certain triggers during every measurement period or only at the end of a measurement period, for example in case measurements differ from a reference measurement by a margin above or below a predefined threshold, wherein the reference may be signaled by the macro base station as a part of the request 206, wherein the reference measurement may be obtained from a list of predefined maps known to the user equipment or it may be signaled for an entire map which was previously not known in the user equipment. At step 208, the user equipment measures and reports the request information based on the received measurement and reporting configuration.

In accordance with an embodiment of the first aspect of the invention, the macro base station may use the report received from the UE and the reference RF maps to identify candidate small cells within the vicinity of the UE. It is noted that this is done in accordance with an embodiment in the macro base station, however it may also be done at other entities of the network environment in accordance with other embodiments. The identification of candidate small cells within the vicinity of the UE by the macro base station is implementation specific and involves the use of the fingerprints reported by the UE and the reference RF maps or fingerprints at the macro base station to determine small cells within the vicinity of the UE. Several machine learning or estimation approaches may be employed, and the identified small cells are referred to as "candidate" small cells. The output of the this process provides an estimate of the geographic proximity of the UE to one or more small cells, however, it does not provide information about the quality of a potential link that can be formed between the UE and the one or more candidate small cells.

Further steps for setting up a communication between the UE and one of the candidate small cells may be done using conventional techniques or may be done using one or more of the further aspects of the present invention that are described in further detail below. For example, the activation and the setup of a communication between the user equipment and one or more of the sleeping small cell base stations may be done in accordance with conventional approaches. In accordance with other embodiments the communication setup be performed in accordance with one or more of the following further aspects of the present invention that will be described in further detail below.

In above described embodiment of the first aspect of the invention, the small cell base station obtained the fingerprint in response to a request from the macro base station, i.e., measurement was performed under the control of the macro base station requesting the one or more small cell base stations to obtain the information, e.g. the fingerprints. However, the invention is not limited to such embodiments. Rather, in accordance with other embodiments, the measurements may be performed proactively by a small cell base station (independent of the macro base station, i.e. no request is issued from the macro base station to the small cell base station). In accordance with embodiments, the measurement may be initiated upon setting up the small cell base station (e.g., when installing the small cell base station in the network) as part of its self-configuration process, or when changing its state, or at fixed or variable time intervals.

In accordance with other embodiments, other network entities may signal the small cell base station to perform the measurement.

$2^{nd}$ Aspect—Small Cell Detection and Channel Quality Determination on Candidate Resources FIG. 3 shows a block 300 regarding the second aspect of the present invention allowing to determine candidate resources to be used in a communication between a user equipment and a small cell base station in an efficient, reliable and fast way.

At step 302 the macro base station issues a request for a beacon transmission on specific candidate resources to the candidate small cell $104_1$, which may be a cell that has been determined in accordance with the first aspect of the present invention or any other active cell in a network including a plurality of small cells controlled by the macro base station. Following the sending of the request 302 to the small cell base station $104_1$, the macro base station 100, at step 304, sends a request to the user equipment 112 requesting a channel quality measurement on the candidate resources which have also been signaled to the candidate small cell base station $104_1$. At step 306 the user equipment 112 performs the measurement and reports the requested information back to the macro base station 100.

In accordance with embodiments of the second aspect of the present invention, the request sent at step 302 from the macro base station 100 to the candidate small cell base station $104_1$ includes information about the beacon format, for example a cell-specific or UE-specific format, that can be recognized easily by the user equipment 112. Also, the request may include information about the beacon transmission configuration, which may be a one shot transmission, i.e. the candidate small cell base station $104_1$ may be controlled to transmit the beacon signal for a predefined time period on one resource. Also, the transmission of the beacon for a predefined time period on multiple resources may be signaled to the base station $104_1$. In case the small cell base station $104_1$ does not support simultaneous transmissions from multiple resources, also the timing and order of the beacon transmission on the different resources is configured by the macro base station 100 via the request sent at step 302. The reference timing may be the macro cell frame. In addition, the candidate small cell base station $104_1$ receives information about its desired behavior, for example that it is useful to send an acknowledgement back to macro base station 100 after receiving the configuration information at step 302.

At step 304, in accordance with embodiments the macro base station 100 may send to the user equipment 112 beacon measurement configuration information, including information about the objects to be measured, like the frequency resources, the pilot patterns and also information about the timing. Also, the reporting configuration may be provided to the user equipment, for example a one shot configuration involving the provision of the report once a timer has expired. A specific UE behavior may be employed by the macro base station 100 and signaled to the UE 112 at step 304. For example, the desired behavior may be such that the UE may send a report even if specified resources are not detected upon expiry of a timer. The UE may be configured to, or to send a report before the expiry of the timer even if all resources have been detected and measured, or to send a report after the expiry of the timer even if all resources have already been detected and measured. Also the contents of the report to be generated by the UE 112 may be signaled to the UE 112 by the macro base station 100. For example, it may be indicated what signal strength or quality measurements, for example RSRP, RSRQ, RSSI, CQI, SIR, SINR are provided, for example in accordance with a desired order specified in the configuration.

In addition, the macro base station 100 may configure one or more active small cell base stations to periodically report resource usage. The one or more small cell base stations may be configured to send their capabilities to the macro base station upon a connection establishment or upon a request.

In accordance with an embodiment of the second aspect 300 of the present invention, a macro-assisted identification and activation of suitable resources is provided enabling the macro base station to determine the optimal resources to activate at a suitable small cell, taking into consideration the capabilities of the small cell and the user equipment. Prior to step 302, in accordance with embodiments, the macro base station 100 may identify candidate resources to activate in one or more suitable small cell base stations. More specifically, the macro base station may use the capabilities of the candidate small cell base stations and the capabilities of the UE 112 as inputs to determine the potentially optimal resources to activate at the candidate small cells. Several algorithms may be employed to perform this task, and the output is a list of potential resources at the candidate small cells which may be used for communication with the UE, which are then referred to as "candidate resources". At step 302, the macro base station 100 requests a beacon transmission on candidate resources, more specifically the macro base station 100 requests one or more small cell base stations 104$_1$ to transmit specific beacons on candidate resources. The macro base station 100 configures the transmission behavior of the candidate small cell base station 104$_1$, for example with regard to what beacons are to be transmitted and on which parts of the candidate resource, when to start the transmission, for how long to transmit and when to stop. For example, beacon transmission can be configured to stop after a pre-set timer expired or after a further explicit signaling from the macro base station to the small cell base station. In addition to the signaling shown in block 300 of FIG. 3, the macro base station may also ask the small cell base station to send updates, if available, about specific parameters such as capabilities, system information and the like.

At step 304, the macro base station 100 requests channel quality measurements on candidate resources, more specifically the macro base station requests the UE 112 to make and report channel quality measurements, for example measurements of the RSRP, RSRQ, SINR, etc., on specific resources on which the beacon transmission takes place. The macro base station 100 may configure the measurement behavior of the UE 112 with regard to the specific resource to measure, when to measure, for how long to measure, and when to stop measuring. Also, the macro base station 100 configures the reporting behavior of the UE 112 with regard to what is to be reported, when the report is to be sent and under what conditions a report may be sent. The UE may be configured to report all measurements on all resources, or the UE may be configured to report only resources for which the channel quality is above or below a certain threshold, wherein the threshold may be known by the UE, in which case a specific reference may be signaled, or which may be unknown to the UE in which case the threshold is explicitly signaled by the macro base station. Also, the macro base station 100 may configure measurement gaps for the UE 112 to perform the measurements desired. The user equipment 112 measures and reports the channel signal quality information at step 306 based on the measurement and reporting configuration.

In accordance with embodiments the macro base station 100 may be configured to determine the best resources to be used by the candidate small cell 104$_1$. On the basis of the measurement reports and additional information, the macro base station 100 may determine the optimal resources to activate in the small cell base station 104$_1$ to serve the user equipment 112. Several algorithms may be employed for this task and additional information may be employed to optimize different objectives for establishing a communication link. The outcome of this process may be a list of selected resources on selected small cells. In accordance with a further embodiment, the macro base station 100 may be configured to signal the resource configuration to a selected one of the small cell base stations, which may either be a base station that has been put into the active mode from its sleep mode or which was already active. The macro base station may also signal to configure the system information for the selected small cell as part of this process. In case multiple small cell base stations were selected, the macro base station may also send information about when the respective small cell base stations should send a confirmation of their resource activation. In accordance with further embodiments, upon a successful activation of the defined resource configuration, the selected small cell base station may send a confirmation to the macro base station. Messages may also be sent to the macro base station in case the small cell base station cannot configure some or all of the resources selected. Also, the configured system information of the small cell base station or updates may be sent to the macro base station during this process.

The signaling between the macro base station and the small cell base station may take place over the backhaul link between the respective elements, and in accordance with embodiments the backhaul link also supports discontinuous reception (DRX), even in case a small cell base station is in its sleep mode.

The second aspect of the present invention may be used together with the first aspect described above as well as with the third and fourth aspects described below. However, it may also be used independent of these further aspects.

$3^{rd}$ Aspect—Interference Determination on Candidate Resources

FIG. 3 shows a block 400 regarding the third aspect of the present invention allowing to determine interference on specific candidate resources. The signaling is similar to the one described above with regard to the second aspect, except that instead of signaling to the user equipment 112 and measuring at the user equipment 112, the signaling and measuring is at a neighboring, potential interfering small cell base station $104_2$.

At step 402 the macro base station 100 sends a request for a beacon transmission on a candidate resource to the candidate small cell base station $104_1$, and at step 404 a request for a channel quality measurement on the candidate resource is sent from the macro base station to the potential interfering small cell base station $104_2$ which carries out the measurement and returns the requested information in a report at step 406.

The request sent at step 402 may include information about the beacon format which may be cell-specific or UE-specific, and information about the beacon transmission configuration which may be a one shot transmission of the beacon signal for a predefined period of time on a single resource, or which may be a one shot transmission for multiple resources. In case the small cell base station does not support simultaneous transmissions on multiple resources, the timing and order of the beacon transmissions on different resources is also configured by the macro base station 100. The macro cell frame may be used as a reference timing.

Further, at step 402 information regarding the small cell behavior may be transmitted, for example that an acknowledgement is sent to the macro base station 100 after receiving the configuration.

The interfering or neighboring small cell $104_2$ receives at step 404 information about the beacon measurement configuration, the beacon reporting configuration, the behavior of the neighboring small cell, and the contents of the report. The neighboring small cell base station $104_2$ may receive information about the measurement objects, like the frequency resources, the pilot pattern and the timing as well as information about measurement gaps. The reporting may be configured such that a report is sent even if a specific resource is not detected after expiry of a timer. Further a neighbor small cell may be configured to send a report only after a timer has expired or to send a report before the expiry of the timer if all resources have been detected and are measured. The contents of the report may be defined to include a signal strength or quality measurement, for example RSRQ, RSSI, CQI, SIR, SINR, in the order that may be specified by the configuration.

Also, the macro base station may configure during this process the one or more small cell base stations to periodically report resource usage. The one or more small cell base stations may send their capabilities to the macro base station upon a connection establishment or upon a request from the macro base station.

In accordance with embodiments of the third aspect 400, the macro base station may use the capabilities of the candidate small cell and the resource usage in the neighborhood of the small cell base stations it controls as input to determine the potentially optimal resources to activate. Several algorithms may be employed to perform this task, and the output may be a list of potential resources at a candidate small cell location. At step 404, the macro base station requests the neighboring small cell $104_2$ to make and report channel quality measurements on the specific resources on which the beacon transmission signaled to the small cell base station $104_1$ at step 402 takes place. The macro base station may configure the measurement behavior with regard to the specific resource to be measured, when the measurement should take place and how long the measurement should be carried out. Also, it may be indicated when the measurement is to be stopped. Further, the reporting behavior of the small cell base station $104_2$ may be configured by the macro base station with regard to what is to be reported, when the report is to be sent and the conditions under which a report may be sent. For example, the neighboring small cell base station may be configured to report all measurements on all resources, or it may be configured to report only resources for which the quality is above or below a certain threshold. In case the threshold is already known by the neighboring small cell base station, only the reference is signaled, otherwise the threshold is explicitly signaled by the macro base station.

A candidate small cell base station $104_1$ may also be a neighboring small cell base station to another candidate small base station, and in this case the macro base station configures it to activate its RF receiving chain to perform the useful measurements. The macro base station may signal to the selected small cell base stations the resources selected.

The third aspect of the present invention may be used together with the first and second aspects described above as well as with the fourth aspect described below. However, it may also be used independent of these further aspects.

$4^{th}$ Aspect—Optimum Resource Configuration Considering UE and Small Cell Capabilities In accordance with the fourth aspect the most suitable resources to use by the UE, given the capabilities of the UE and the small cell serving the UE, are configured in the UE (see block 500 in FIG. 3). A macro base station based approach is taught in accordance with which, initially, the small cell base station signals its small cell base station capabilities to the macro base station, and the user equipment signals its user equipment capabilities to the macro base station. On the basis of these capabilities a suitable configuration for the small cell for serving the UE is determined, e.g. at the macro base station or at another entity of the network environment. Following this, at step 502 the configuration for the small cell to which the user equipment 112 desires to make a connection is sent from the macro base station 100 to the user equipment 112 which returns at step 504 an acknowledgement message to the macro base station.

In accordance with embodiments, at step 504, the UE 112 may also signal to the macro base station 100 that a connection has been established with the small cell base station in reply to an indication from a lower layer of the used communication protocol. In case no indication from such a lower layer is received within a predefined time period, the UE signals at step 504 that no connection has been established. The reconfiguration command sent at step 502 may include information about the resources used by the small cell base station to which the UE 112 desire to make a connection, for example timing information, frequency information, space information, code information and interleaver information. Information about the frame structure, the timing used in the small cell base station, the subcarrier spacing and filters used may also be provided. Additional information about the timer used in the small cell base station, for example a timer value, is provided to the UE 112.

In accordance with further embodiments, the macro base station 100, at step 506, may send a resource configuration to a selected small cell, for example for activating it, in case it was in a sleep mode, or for configuring it for operation with a specific user equipment, for example during a handover. The configuration information to be sent to the small cell base station $104_1$ at step 506 may be determined by conventional approaches, or may be determined on the basis of the aspects described above.

In reply to the receipt of the configuration information, the small cell base station $104_1$ returns, at step 508, an acknowledgment message. Further, by means of the message 508, the candidate small cell may indicate on the basis of information from a lower layer of the communication protocol, that a connection has been established with the UE 112 or not, the latter in case an indication from the lower layer has not been received after a defined time period.

Thus, embodiments of the fourth aspect 500 of the present invention provide a macro-assisted UE small cell connection establishment that facilitates a quick acquisition of system information that may be used by the UE to connect to the configured small cell. Once the macro base station 100 obtained confirmation about the activation of the configured resources in a selected small cell, the small cell reconfiguration command is sent to the UE 112. The command may contain information needed by the UE to establish a connection to the selected small cell, for example the activated resource configuration of the selected small cell and basic system information of the selected small cell. Once this is completed, the UE 112 sends a confirmation of the establishment, for example via the acknowledgement message at step 504.

As mentioned above with regard to all prior aspects, also the fourth aspect to the present invention may be used together with one or more of the first, second and third aspects, however it may also be used independent of the first to third aspects.

Further Aspects

Figure 1:
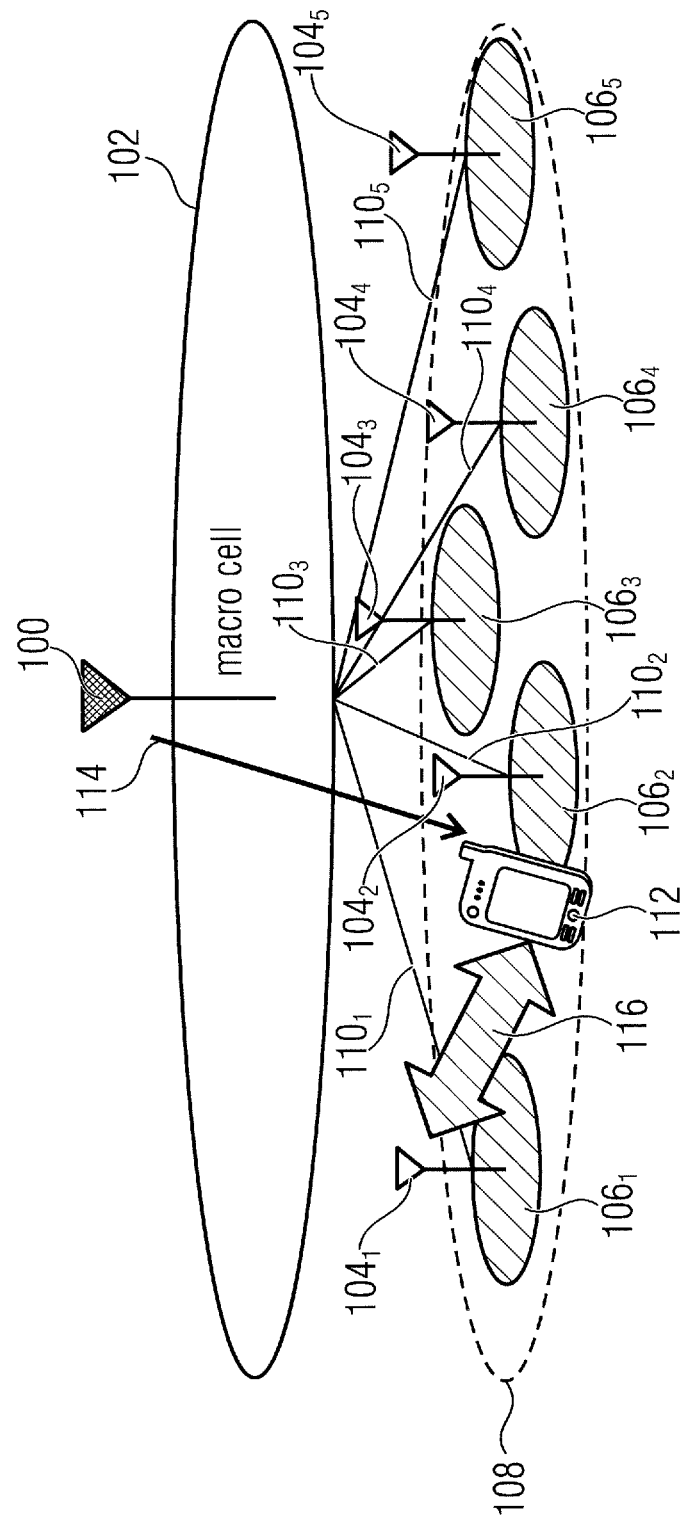
FIG. 1 shows the general structure of a wireless communication system having two distinct overlaid networks.
Figure 4:
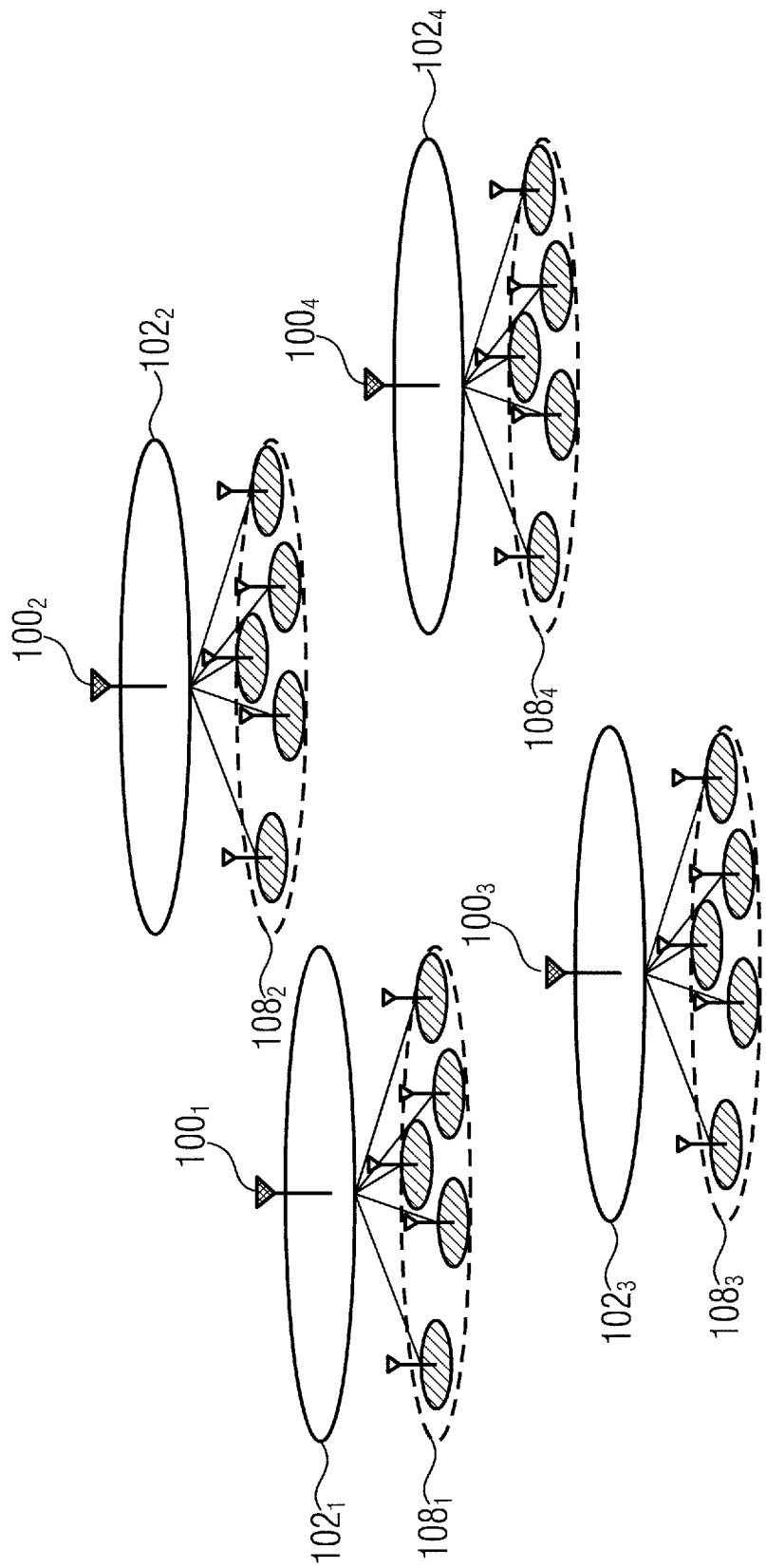
FIG. 4 shows a wireless communication system including a plurality of macro cells.

In accordance with embodiments, a wireless communication system is provided including a plurality of macro base station $100_1$-$100_4$ each including a plurality of small cells, i.e. the wireless communication system includes one or more small cell systems as depicted in FIG. 1, as is schematically represented by FIG. 4.

Figure 5:
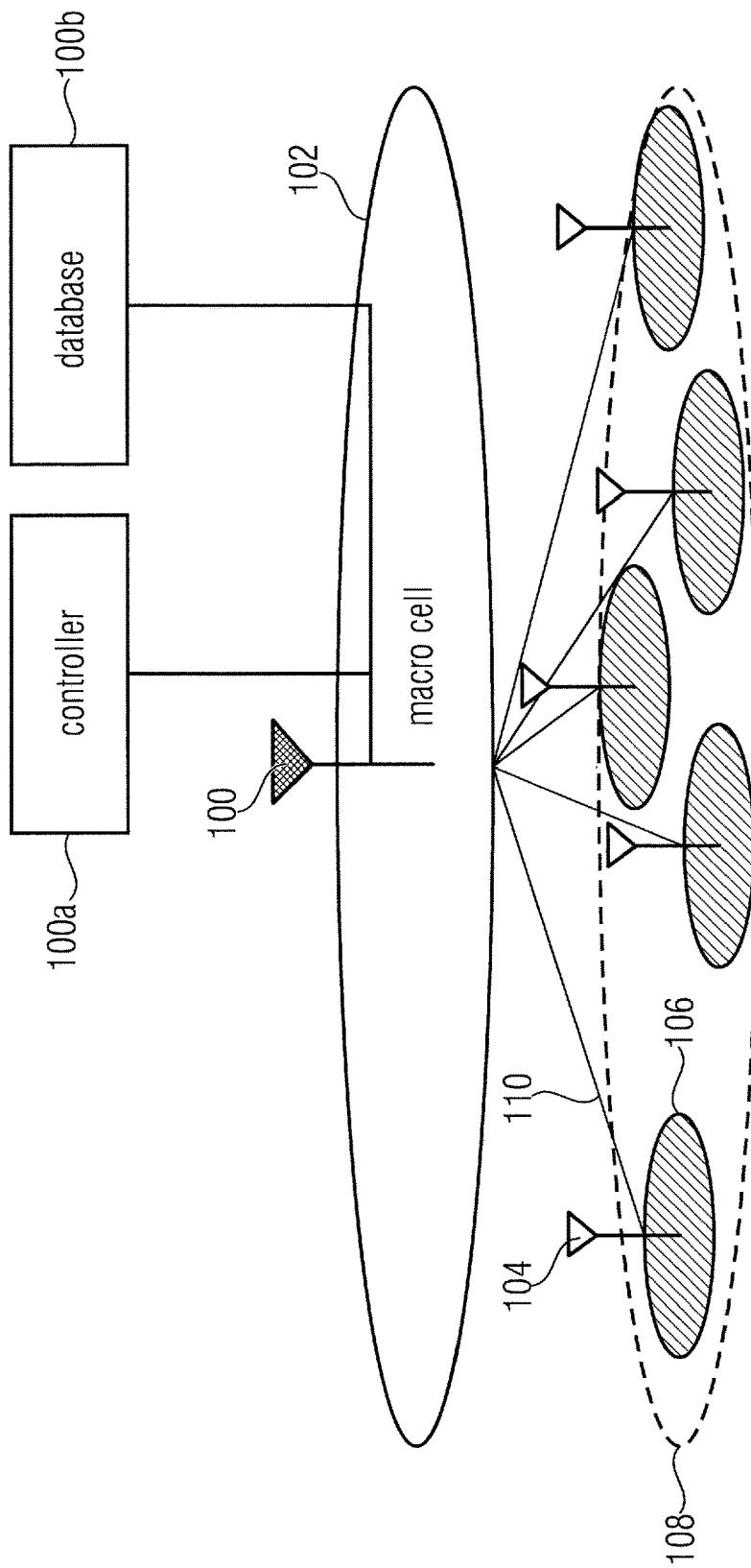
FIG. 5 shows a network as in FIG. 1, wherein the macro base station includes a controller and a database.

In accordance with embodiments, the inventive approach may be implemented, at least in part, in the MeNB 100 including a controller 100a controlling one or more SeNBs and UEs in a way as described above. FIG. 5 shows a network as in FIG. 1 in which the MeNB 100 includes the controller 100a. Further, in accordance with embodiments, the MeNB 100 may also include a database 100b as depicted in FIG. 5 for storing, e.g., the fingerprints received from the SeNBs, the measurements received from the SeNBs and/or the UES, the UE and SeNB capabilities and the like for use by the controller 100a.

Figure 6:
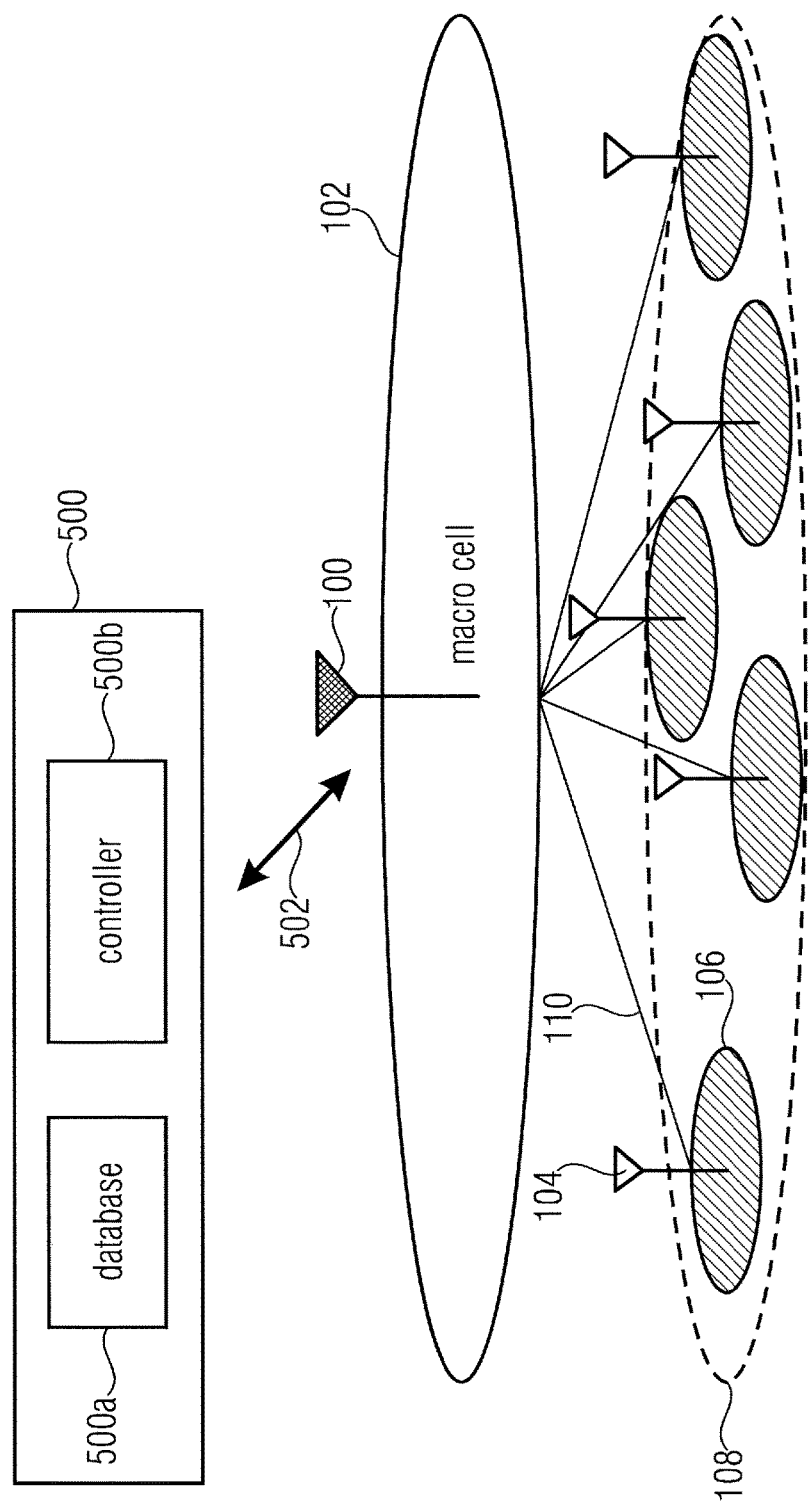
FIG. 6 shows an apparatus in a network of FIG. 1 including a database and a controller coupled via an interface with a macro base station.

In accordance with further embodiments, an apparatus may be provided. FIG. 6 shows the network of FIG. 1 including an apparatus 500 including a database 500a and a controller 500b for controlling one or more SeNBs and UEs in a way as described above. The controller 500b is coupled with the MeNB 100 via an interface that is schematically represented by the connection 502. The apparatus 500 may store in its database 500a, for example, the fingerprints received from the SeNBs, the measurements received from the SeNBs and/or the UEs, the UE and SeNB capabilities and the like, for use by the controller 500b.

Further, in accordance with embodiments, the SeNBs 104, for example by means of their backhaul connection, are provided with an interface for receiving the signal controlling the SeNB in a way as described above.

In accordance with embodiments, the above described small cell base stations and macro cell base stations may comprise or consist of antennas, RF units, software functions, and their associated equipment. Such software functions may be running anywhere within a network cloud."

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A method for controlling a small cell base station in a wireless communication system comprising a plurality of small cell base stations controlled by a macro base station, the method comprising:
   requesting, by the macro base station, from a small cell base station an RF fingerprint on a specific resource;
   measuring, by the small cell base station, the RF fingerprint with respect to neighboring small cells for acquiring information describing a vicinity around the small cell base station; and
   reporting the RF fingerprint from the small cell base station to the macro base station,
   wherein, for determining a small base station in the wireless communication system for serving a user equipment, the method further comprises:
      in response to a request from the macro base station to the user equipment, taking, by the user equipment, a measurement for acquiring information describing a vicinity around the user equipment;
      reporting the measured information from the user equipment to the macro base station; and
      based on the reported information from the user equipment and based on reference information characterizing the vicinity of the plurality of the small cell base stations under the control of the macro base station, identifying one or more sleeping candidate small cell base stations within the vicinity of the user equipment from the plurality of small cell base stations.

2. The method of claim 1, comprising configuring, by the macro base station, the small cell base station with regard to the measurement.

3. The method of claim 2, wherein configuring the small cell base station comprises configuring the behavior of the small cell base station when the small cell base station changes between an active state and a sleep state.

4. The method of claim 3, wherein the small cell base station, when it changes between an active state and a sleep state, is configured to
   stop the measurement, store the last configuration and resume the measurements after wake up; or
   stop the measurement and discard the configuration; or
   stop the measurement, store the last configuration and resume the measurement upon explicit signaling from the macro base station; or
   continue the measurement.

5. The method of claim 2, wherein configuring the small cell base station defines one or more of:
   a behavior of the small cell base station;
   a measurement object;
   a report configuration; and
   a quantity to be reported.

6. The method of claim 5, wherein the measurement object comprises one or more of the frequency resource, the radio access technology, the time resource, the small cell base stations and/or the macro base stations.

7. The method of claim 5, wherein the report configuration comprises one or more of the report contents, the reporting triggers, and/or the reporting periodicity.

8. The method of claim 5, wherein the quantity to be reported comprises one or more of a signal strength metric, like RSRP, RSRQ, SIR, SINR, CQi, RSSI, and/or an identity of an entity discovered, like PCID, BCID, unique CID.

9. The method of claim 2, wherein the small cell base station is configured by the macro base station upon a connection establishment between the small cell base station and the macro base station.

10. The method of claim 2, wherein the small cell base station sends an acknowledgement to the macro base station once the configuration is successfully received at the small base station.

11. The method of claim 1, wherein the small cell base station reports the measurement to the macro base station upon a connection establishment between the small cell base station and the macro base station.

12. The method of claim 1, wherein the small cell base station sends the report even if no information describing a vicinity around the small cell base station is acquired by the small cell base station.

13. A wireless communication system, comprising:
   a macro base station; and
   a plurality of small cell base stations controlled by the macro base station,
   wherein the macro base station and one or more of the small cell base stations are configured to operate in accordance with the method of claim 1.

14. A non-transitory digital storage medium having a computer program stored thereon which, when executed on a computer, carries out the method for controlling a small cell base station in a wireless communication system comprising a plurality of small cell base stations controlled by a macro base station, the method comprising:
   requesting, by the macro base station, from a small cell base station an RF fingerprint on a specific resource;
   measuring, by the small cell base station, the RF fingerprint with respect to neighboring small cells for acquiring information describing a vicinity around the small cell base station; and
   reporting the RF fingerprint from the small cell base station to the macro base station,
   wherein, for determining a small base station in the wireless communication system for serving a user equipment, the method further comprises:
      in response to a request from the macro base station to the user equipment, taking, by the user equipment, a measurement for acquiring information describing a vicinity around the user equipment;
      reporting the measured information from the user equipment to the macro base station; and
      based on the reported information from the user equipment and based on reference information characterizing the vicinity of the plurality of the small cell base stations under the control of the macro base station, identifying one or more sleeping candidate small cell base stations within the vicinity of the user equipment from the plurality of small cell base stations.

* * * * *